(12) United States Patent
Fukusako et al.

(10) Patent No.: US 7,989,102 B2
(45) Date of Patent: Aug. 2, 2011

(54) BATTERY PACK STRUCTURE WITH HEATER

(75) Inventors: Naoki Fukusako, Toyohashi (JP);
Shuhei Marukawa, Toyohashi (JP);
Masahiro Misu, Nissin (JP); Toyohiko Eto, Toyota (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 71 days.

(21) Appl. No.: 11/889,179

(22) Filed: Aug. 9, 2007

(65) Prior Publication Data

US 2008/0096072 A1    Apr. 24, 2008

(30) Foreign Application Priority Data

Aug. 28, 2006  (JP) .................................. 2006-230683

(51) Int. Cl.
*H01M 10/50* (2006.01)
(52) U.S. Cl. ......... 429/120; 429/149; 429/163; 429/121
(58) Field of Classification Search .................. 429/120, 429/121, 149, 163
See application file for complete search history.

(56) References Cited

U.S. PATENT DOCUMENTS

| | | | | |
|---|---|---|---|---|
| 3,156,813 A | * | 11/1964 | Trainor | 219/526 |
| 4,585,712 A | * | 4/1986 | Wedlake | 429/50 |
| 2004/0232891 A1 | * | 11/2004 | Kimoto et al. | 320/150 |

FOREIGN PATENT DOCUMENTS

| | | |
|---|---|---|
| JP | U 60-192367 | 12/1985 |
| JP | A 2002-216731 | 8/2002 |

* cited by examiner

*Primary Examiner* — Dah-Wei D Yuan
*Assistant Examiner* — Edu E Enin-Okut
(74) *Attorney, Agent, or Firm* — Oliff & Berridge, PLC (57) ABSTRACT

A battery pack structure with heater including a plurality of secondary batteries, a housing case housing them, and a heater is arranged to prevent uneven heating among the secondary batteries, reducing temperature variations among the secondary batteries. Specifically, the battery pack structure with heater of the present invention includes: a battery pack including a plurality of secondary batteries and a housing case housing them; a first heater; and a second heater. The housing case includes a metal spaced part separated with a space S from each of the secondary batteries. The first heater and the second heater are placed on at least part of an outer surface of the spaced part of the housing case.

5 Claims, 10 Drawing Sheets

BATTERY PACK STRUCTURE WITH HEATER

BACKGROUND OF THE INVENTION

1. Field of the Invention

The present invention relates to a battery pack structure with a heater, comprising a plurality of secondary batteries each of which has a power generating element and a battery case accommodating it, a housing case that houses the plurality of secondary batteries, and a heater.

2. Description of Related Art

Batteries such as nickel-metal hydride storage batteries have been watched as power sources of portable devices and power sources of electric vehicles, hybrid electric vehicles, and others.

However, the batteries such as nickel-metal hydride storage batteries have problems that discharge capacity is apt to decrease during cold conditions, failing to provide adequate output power. If such battery is used as a power source of an electric vehicle, a hybrid electric vehicle, or the like, for instance, it could not generate sufficient output power in low-temperature conditions, e.g., in a cold region where temperatures may fall to sub-zero.

In recent years, some techniques for solving the above problems by attaching a heater to a battery to heat the battery by use of a household power source have been proposed (e.g., Jpn. unexamined utility model publication No. 60 (1985)-192367 and Jpn. unexamined patent publication No. 2002-216731).

Jpn. unexamined utility model publication No. 60 (1985)-192367 discloses a battery pack structure with heater, in which a sheet heater is placed inside a bottom of a housing case made of a heat insulation material and two batteries are arranged in contact with the sheet heater in a container. Jpn. unexamined patent publication No. 2002-216731 discloses a heater system having a heater attached to a battery. The techniques disclosed in the above publications, in which the batteries are heated by use of the heaters, could improve the output characteristics of the batteries even in low-temperature conditions.

According to the techniques disclosed in the above publications including direct heating of the batteries by the heaters, the batteries tend to excessively rise in temperature if the temperatures of the heaters abnormally increase due to any malfunction or failure.

When a plurality of secondary batteries (a "secondary battery" in the following description represents a battery including a power generating element and a battery case accommodating the power generating element) is heated according to the method configured to directly heat batteries by use of a heater as disclosed in the above publications, there is a case where the battery temperatures widely vary among the heated batteries. This may be caused when some of the secondary batteries are out of contact with the heater, because the secondary batteries out of contact with the heater and the secondary batteries in contact with the heater are largely different in quantity of heat conducted from the heater. In such case, the output characteristics are largely different from one secondary battery to another. Thus, an entire battery pack could not produce stable output.

SUMMARY OF THE INVENTION

The present invention has been made in view of the above circumstances and has an object to provide a battery pack structure with heater, comprising a plurality of secondary batteries, a housing case that houses them, and a heater, the battery pack structure being arranged to prevent uneven heating among the secondary batteries and minimize temperature variations among the secondary batteries.

To achieve the purpose of the invention, there is provided a battery pack structure with heater comprising: a battery pack including: a plurality of secondary batteries each of which includes a power generating element and a battery case accommodating the power generating element; and a housing case that houses the plurality of secondary batteries; and a heater, wherein the housing case includes a spaced part made of metal which is located with a space from each of the secondary batteries, and the heater is placed on at least part of an outer surface of the spaced part.

In the battery pack structure with heater of the present invention, a heater is placed on at least part of the outer surface of the metal spaced part located in spaced relation to each of the secondary batteries. According to this configuration, heat will be conducted from the heater to the metal spaced part, heating the air in the space through the heated spaced part. Each secondary battery is exposed to the heated air and thus heated.

It is to be noted that the "spaced part" is integrally formed as a portion of the housing case so as to be spaced apart from the secondary batteries.

Since each secondary battery is indirectly heated as above by the spaced part and the air in the space, it is possible to prevent each secondary battery from becoming unevenly heated, and reduce variations in temperature among the secondary batteries. This makes it possible to minimize variations in output characteristics among the secondary batteries. The entire battery pack can therefore produce stable output.

Further, even when the heater abnormally rises in temperature due to any malfunction or failure, an excessive increase in temperature of each secondary battery can be prevented owing to the space provided between the heater and each secondary battery.

Here, the "power generating element" is accommodated in a battery case for providing a battery function and for example includes positive plates, negative plates, separators, and electrolyte.

The secondary battery may include a cell constituted of one power generating element and a battery case housing it. Further, it may include a battery module provided with a battery case having a plurality of integrally formed compartments and a plurality of power generating elements accommodated individually in the compartments.

In the above battery pack structure with heater, preferably, the heater is detachably placed on the outer surface of the spaced part.

In the above battery pack structure with heater, it is preferably configured such that the heater constitutes a heater unit in association with the holding members which hold the heater(s) directly or indirectly, and the holding member detachably holds the heater unit on the outer surface of the housing case while the heater is held in contact with at least part of the outer surface of the spaced part of the housing case.

In the above battery pack structure with heater, preferably, the housing case and the plurality of secondary batteries are arranged in a positional relation that the spaced part of the housing case is located with the space from and below the secondary batteries in a vertical direction when the battery pack structure with heater is disposed in a position in use.

In the above battery pack structure with heater, preferably, the secondary batteries are arranged in a row, the spaced part of the housing case includes a specific spaced portion located with the space from a specific secondary battery of the secondary batteries in a direction perpendicular to a row direction of the secondary batteries, and the heater is placed on the outer surface of the spaced part excepting the specific spaced portion.

In the above battery pack structure with heater, preferably, the secondary batteries are connected in series to each other.

In the above battery pack structure with heater, preferably, the space between the spaced part of the housing case and the secondary batteries also serves as an air passage of cooled air.

In the above battery pack structure with heater, preferably, the heater is configured to be energized by a household AC power source to generate heat.

Further, in a battery pack comprising: a plurality of secondary batteries each including a power generating element, and a battery case accommodating the power generating element; and a housing case housing the plurality of secondary batteries, it is preferable that the housing case includes a metal spaced part located with a space from each secondary battery, and a heater is detachably placed on at least part of an outer surface of the spaced part of the housing case.

In this battery pack, the heater can be attached to the outside of the housing case (concretely, on the outer surface of the spaced part), thereby facilitating an attaching work of the heater. Further, as compared with a battery pack provided with a heater inside the housing case, a detaching work of the heater is easier. This configuration can improve workability in maintenance of the heater even after assembly with the battery pack.

Whether or not the heater is attached to the battery pack is determined depending on ambient temperatures in use, achieving good versatility and low cost. For instance, the heater may be attached to the battery pack only when the battery pack is used in a cold region so that the battery pack is used without the heater in other regions.

Further, the heater can be placed on at least part of the outer surface of the metal spaced part located with a space from each secondary battery. When the heater is placed in such position, the heat is conducted from the heater to the spaced part, thereby heating the air in the space through the heated spaced part. Each secondary battery is exposed to such heated air and thus heated.

As above, each secondary battery is heated indirectly through the spaced part and the space to prevent uneven heating among the secondary batteries, reducing temperature variations among the secondary batteries. This makes it possible to reduce variations in output characteristics among the secondary batteries. The entire battery pack can therefore produce stable output.

Even when the temperature of the heater abnormally rises due to any malfunction or failure, an excessive increase in temperature of each secondary battery can be prevented owing to the space between the heater and each secondary battery.

Of the aforementioned inventions related to the battery pack structure with heater, the inventions directed to the battery pack can also be applied to the present battery pack.

Further, the aforementioned battery pack preferably comprises a detachable heater unit including the heater and the holding member holding the heater directly or indirectly, the holding member being arranged to detachably hold the heater unit on the outer surface of the housing case so that the heater makes contact with at least part of the outer surface of the spaced part of the housing case.

Further, in a heater unit comprising a heater and a holding member that holds the heater directly or indirectly, preferably, the holding member is arranged to detachably hold the heater unit on an outer surface of a housing case so that the heater(s) make contact with at least part of an outer surface of a metal spaced part of a battery pack comprising: a plurality of secondary batteries each of which includes a power generating element and a battery case that accommodates the power generating element; and a housing case that houses the secondary batteries, the housing case including the spaced part located with a space from each secondary battery.

This heater unit is arranged to be detachably attached to the battery pack comprising: the plurality of secondary batteries each including a power generating element and a battery case that accommodates the power generating element; and a housing case that houses the secondary batteries, the housing case including the metal spaced part located with a space from each secondary battery. Specifically, the heater unit is configured to be detachably attached to the outer surface of the housing while a heater makes contact with at least part of the outer surface of the spaced part of the battery pack.

According to the above heater unit, therefore, the heater can easily be attached to the outside of the housing case (i.e., to the outer surface of the spaced part) by use of the holding member. Further, the heater unit is detachable from the outside of the housing case. Thus, even after assembly with the battery pack, the heater can provide good workability in maintenance as compared with the heater unit configured to be placed inside the housing case.

In addition, the heater can be placed on (held in contact with) at least part of the outer surface of the metal spaced part located with a space from each secondary battery. When the heater is arranged in such position, the heat will be conducted from the heater to the spaced part, heating the air in the space through the heated spaced part. Accordingly, each secondary battery is exposed to the heated air and thus heated.

Since each secondary battery is heated as above, uneven heating among the secondary batteries can be prevented, reducing temperature variations among the secondary batteries. This makes it possible to reduce variations in output characteristics among the secondary batteries. The entire battery pack can produce stable output.

Even where the temperature of the heater abnormally rises due to any failure or malfunction, the temperature of each battery can be prevented from excessively increasing owing to the space as well as the spaced part existing between the heater and each secondary battery.

Of the aforementioned inventions related to the battery pack structure with heater, the inventions directed to the heater and the heater unit can also be applied to the present heater unit.

In the aforementioned heater unit, preferably, the holding member includes a holding surface for holding the heater(s) directly or indirectly and another surface opposite the holding surface, and an insulating member placed on the opposite surface.

DETAILED DESCRIPTION OF THE PREFERRED EMBODIMENTS

A detailed description of a preferred embodiment of a battery pack structure with heater (hereinafter, referred to as a "heater-equipped battery pack structure") 10 according to the present invention will now be given referring to the accompanying drawings.

Figure 1:
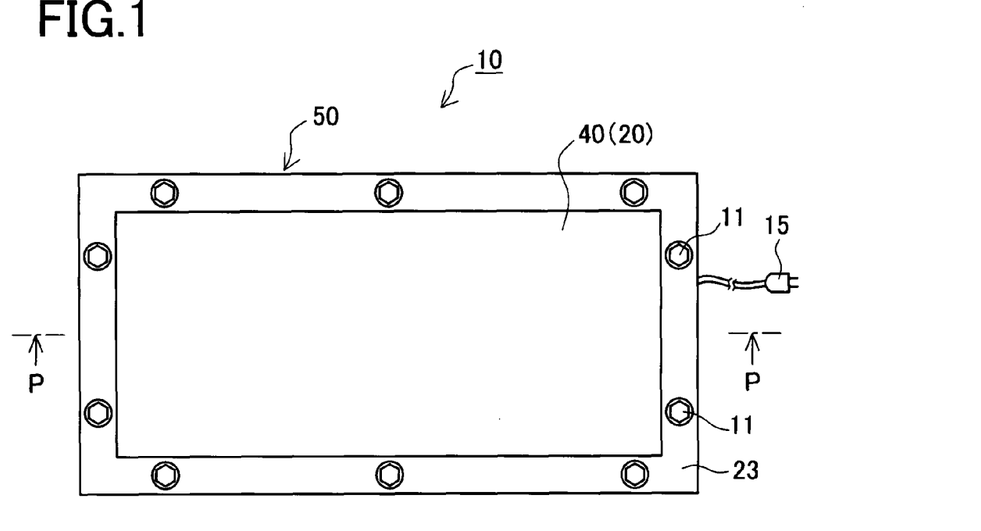
FIG. 1 is a top view of a battery pack structure with heater of a preferred embodiment.
Figure 2:
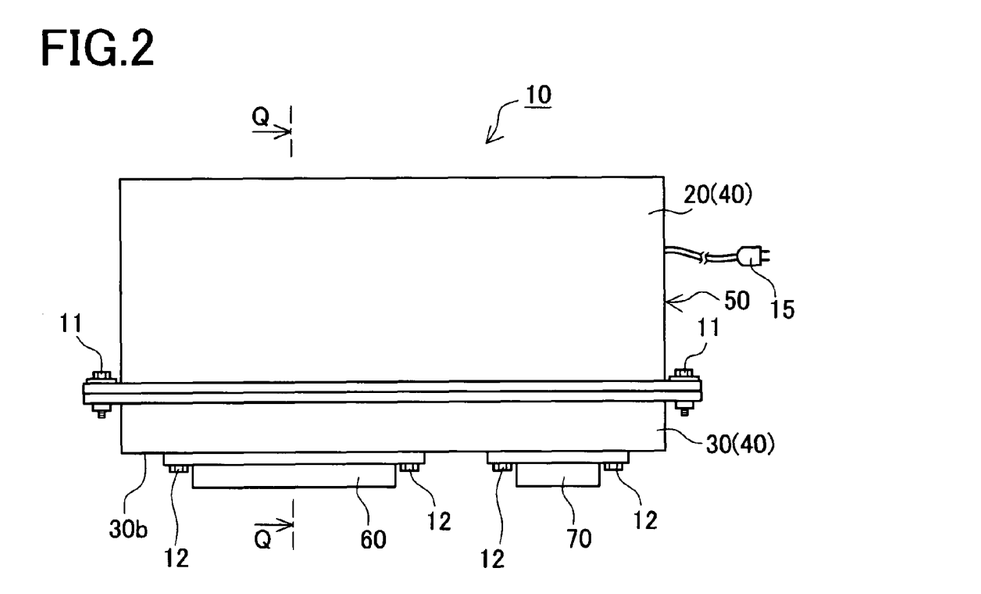
FIG. 2 is a side view of the battery pack structure with heater of the embodiment.

The heater-equipped battery pack structure 10 includes a battery pack 50, a first heater unit 60, and a second heater unit 70 as shown in FIGS. 1 and 2.

Figure 3:
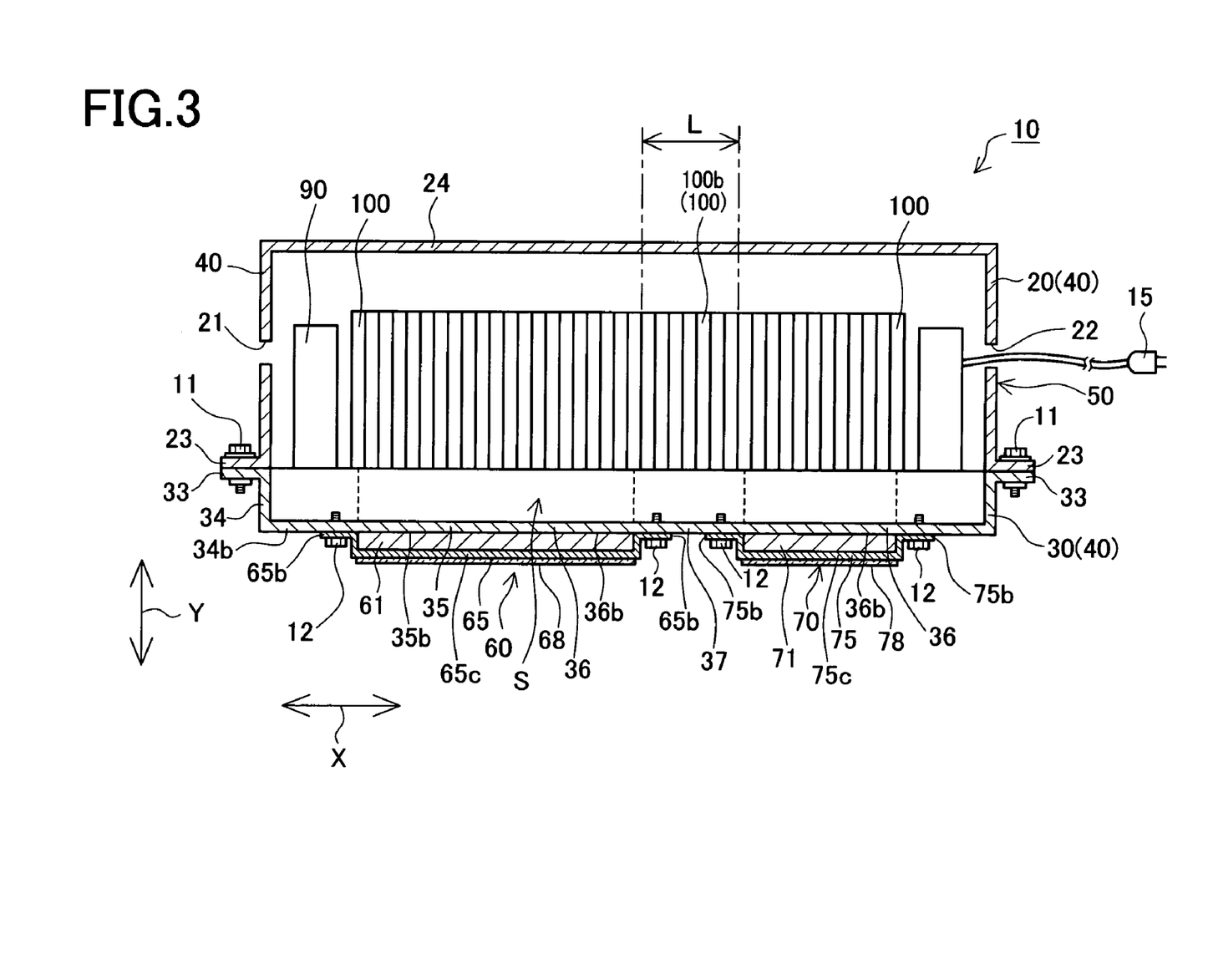
FIG. 3 is a sectional view of the battery pack structure with heater, taken along a line P-P in FIG. 1.

The battery pack 50 includes a housing case 40 constituted of a first housing member 20 and a second housing member 30, and a plurality of secondary batteries 100 (forty batteries in the present embodiment) housed in the housing case 40, as shown in FIG. 3.

Figure 4:
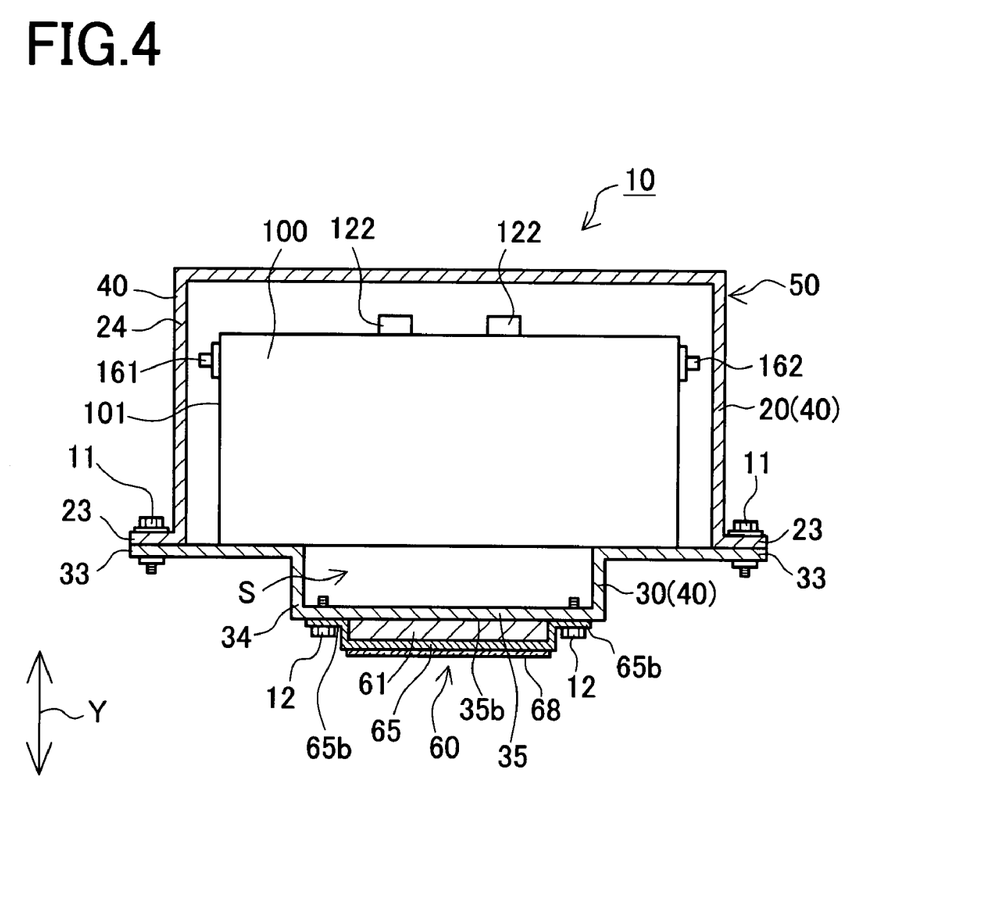
FIG. 4 is a sectional view of the battery pack structure with heater taken along a line Q-Q in FIG. 2.
Figure 5:
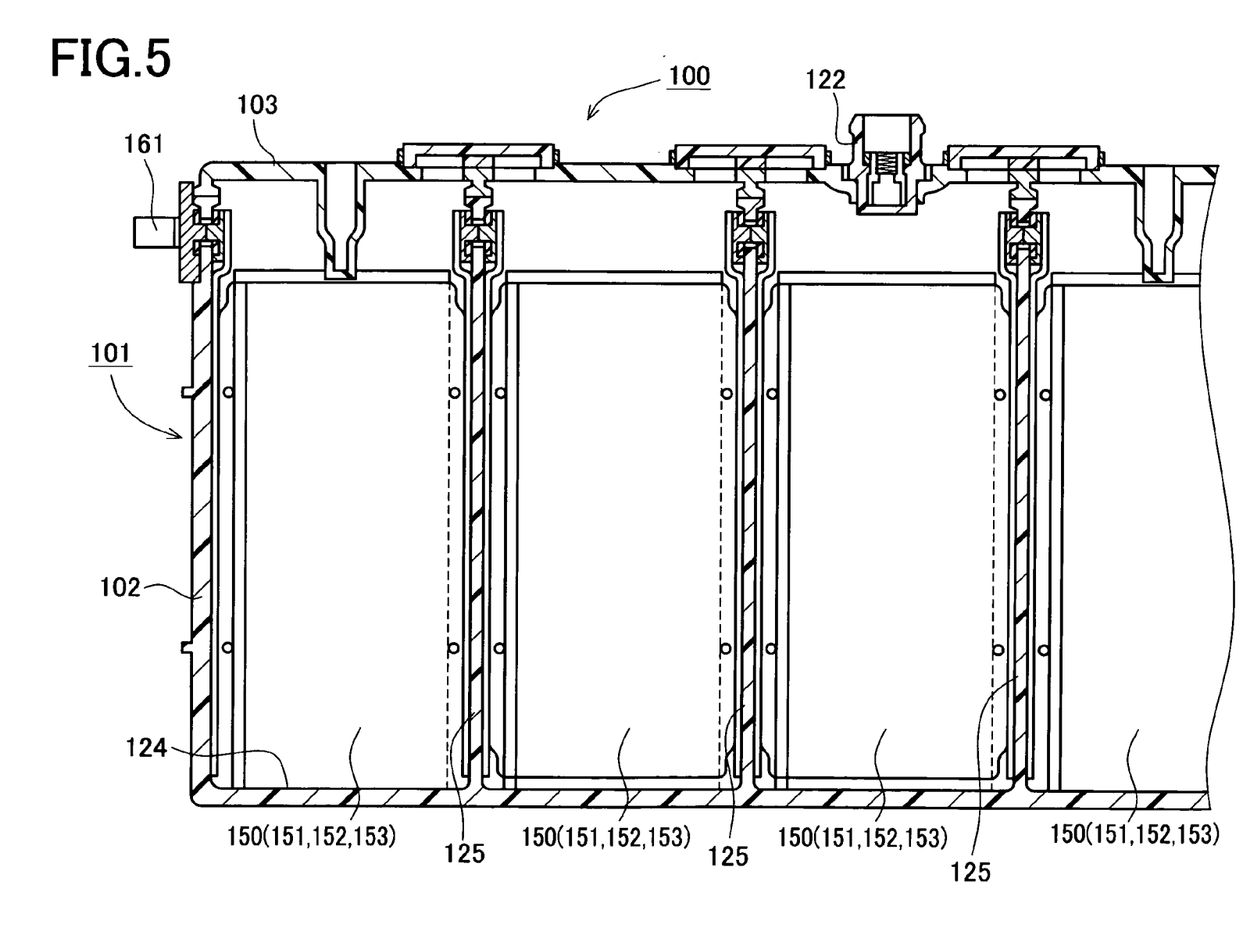
FIG. 5 is a sectional view of a secondary battery of the present embodiment.

Each secondary battery 100 is a nickel-metal hydride storage sealed battery provided with a battery case 101, a positive terminal 161 and a negative terminal 162, as shown in FIG. 4. The battery case 101 has a resin case body 102 of a nearly rectangular box shape and a resin cover 103 of a nearly rectangular plate shape. The case body 102 is internally divided into six compartments 124 by partition walls 125. Each compartment 124 accommodates an electrode plate group 150 (positive plates 151, negative plates 152, and separators 153) and an electrolyte (not shown). The electrode plate groups 150 individually accommodated in the compartments 124 are connected in series to one another. Thus, the secondary battery 100 of the present embodiment constitutes a battery module including six cells connected in series. The electrode plate group 150 and the electrolyte (not shown) correspond to a power generating element. The cover 103 is provided with a safety valve 122.

In the present embodiment, as shown in FIG. 3, forty secondary batteries 100 configured as above are arranged in a row in a row direction X (a lateral direction in FIG. 3) and connected in series to one another.

The first housing member 20 is made of metal in a rectangular recessed form which includes a housing part 24 housing the secondary batteries 100 and a rectangular annular flange 23 surrounding an open end of the housing part 24. The second housing member 30 includes a rectangular recessed metal part 34 and a rectangular annular flange 33 surrounding an open end of the recessed part 34.

On the flange 33 of the second housing member 30, the secondary batteries 100 are fixedly placed (see FIGS. 3 and 4). Further, the first housing member 20 is fixed to the second housing member 30 with mounting bolts 11 so that the flange 23 is placed in contact with the flange 33 of the second housing member 30, containing the secondary batteries 100 in the housing part 24.

The thus configured battery pack 50 includes, as part of a bottom wall 34b of the recessed part 34 of the second housing member 30, a part 35 located in spaced relation to the secondary batteries 100, leaving a space S therefrom, as shown in FIGS. 3 and 4. This part 35 is hereinafter referred to as a "spaced part".

Figure 6:
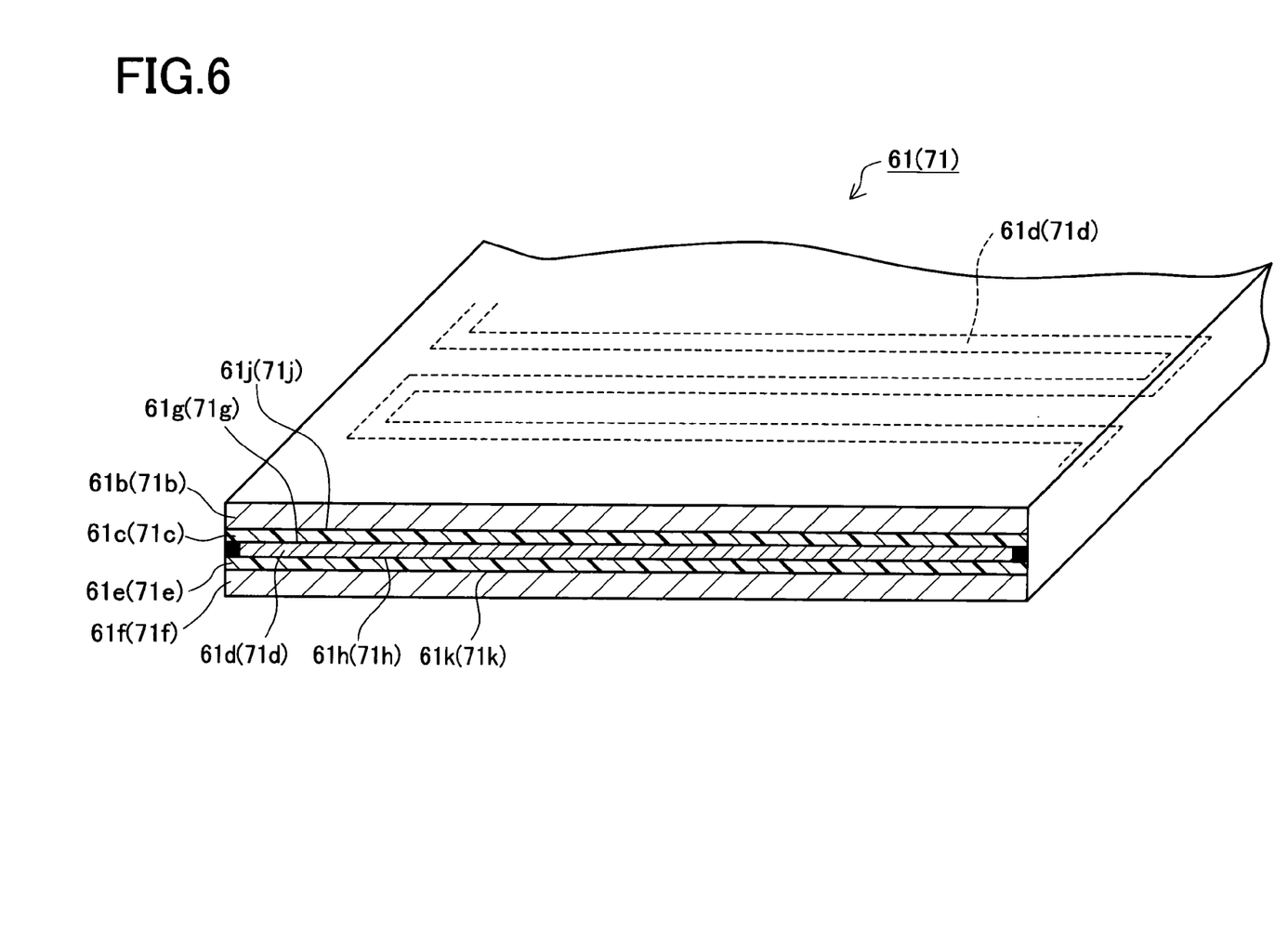
FIG. 6 is a perspective sectional view of a first heater (a second heater)

The first heater unit 60 includes a first heater 61, a first holder 65 that holds the first heater 61, and a heat insulating member 68. The first heater 61 is a sheet heater of a laminated structure, as shown in FIG. 6, including a heater element 61d extending along a plane in a predetermined pattern indicated by a dotted line, a first insulating resin layer 61c laminated on an upper surface 61g of the heater element 61d and a second insulating resin layer 61e laminated on a lower surface 61h of the heater element 61d, and a first metal layer 61b laminated on an upper surface 61j of the first insulating resin layer 61c and a second metal layer 61f laminated on a lower surface 61d of the second insulating resin layer 61e. The heater element 61d is made of nickel-chromium alloy. The first and second insulating resin layers 61c and 61e are formed of polyimide films. The first and second metal layers 61b and 61f are formed of aluminum plates.

Figure 7:
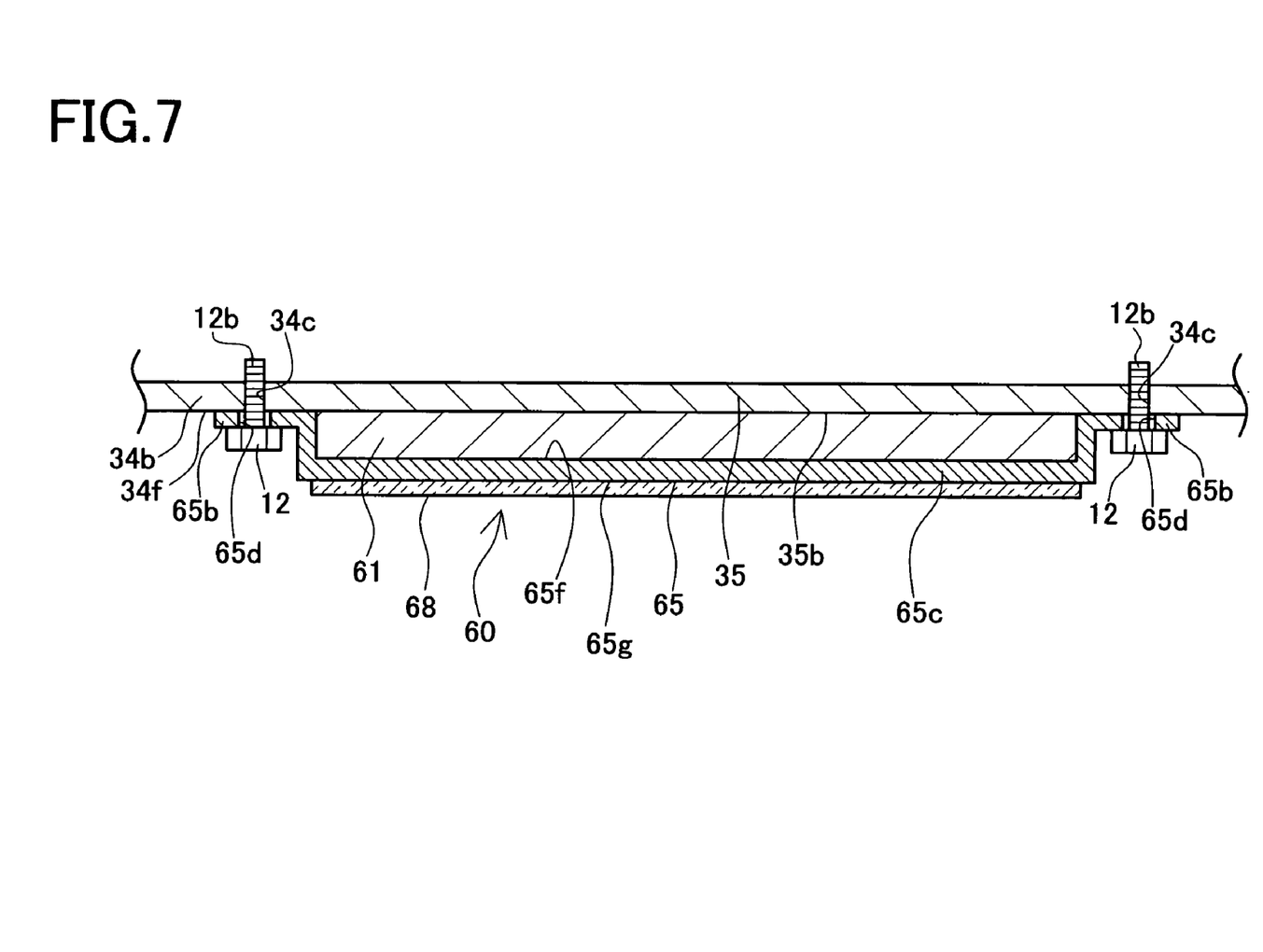
FIG. 7 is an enlarged sectional view of part of the battery pack structure with heater, including a first heater unit and its surrounding portions.

The first holder 65 is formed in recessed rectangular shape, including a holding part 65c internally holding the first heater 61 and a rectangular annular flange 65b surrounding an open end of the holding part 65c. This flange 65b is formed with a plurality of through holes 65d each allowing a threaded portion 12b of a mounting bolt 12 to pass through as shown in FIG. 7. The bottom wall 34b of the second housing member 30 is formed with threaded holes 34c with each of which the threaded portion 12b of the mounting bolt 12 threadably engages.

In the present embodiment, the threaded portion 12b of the mounting bolt 12 is inserted through the through hole 65d of the flange 65b and tightened in the threaded hole 34c of the bottom wall 34b of the second housing member 30, thereby detachably fixing the first heater unit 60 to an outer surface 34f of the bottom wall 34b of the second housing member 30. Thus, the first heater 61 is fixed in contact relation to the outer surface 35b of the spaced part 35 of the second housing member 30.

The second heater unit 70 includes a second heater 71 and a second holder 75 that holds the second heater 71 as shown in FIG. 3. The second heater 71 is a sheet heater of a laminated structure, as shown by reference codes in parentheses in FIG. 6, including a heater element 71d extending along a plane in a predetermined pattern indicated by a dotted line, a first insulating resin layer 71c laminated on an upper surface 71g of the heater element 71d and a second insulating resin layer 71e laminated on a lower surface 71h of the heater element 71d, and a first metal layer 71b laminated on an upper surface 71j of the first insulating resin layer 71c and a second metal layer 71f laminated on a lower surface 71k of the second insulating resin layer 71e. The heater element 71d is made of nickel-chromium alloy. The first and second insulating resin layers 71c and 71e are formed of polyimide films. The first and second metal layers 71b and 71f are formed of aluminum plates.

Figure 8:
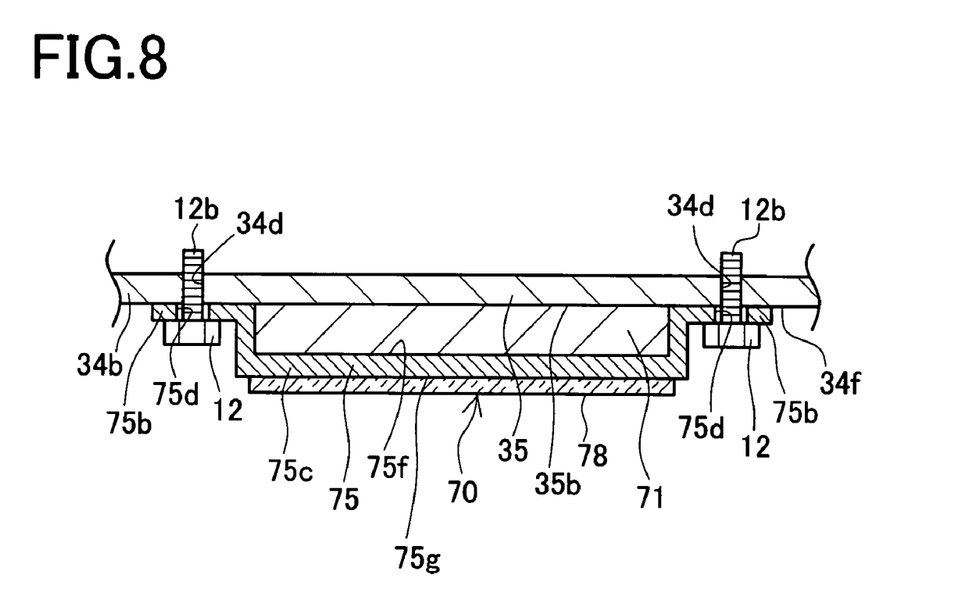
FIG. 8 is an enlarged sectional view of part of the battery pack structure with heater, including a second heater unit and its surrounding portions.

The second holder 75 is formed in rectangular recessed shape, including a holding part 75c internally holding the second heater 71 and a rectangular annular flange 75b surrounding an open end of the holding part 75c. This flange 75b is formed with a plurality of through holes 75d each allowing a threaded portion 12b of a mounting bolt 12 to pass through as shown in FIG. 8. Further, the bottom wall 34b of the second housing member 30 is also formed with threaded holes 34d with each of which the threaded portion 12b of the mounting bolt 12 threadably engages.

In the present embodiment, the threaded portion 12b of the mounting bolt 12 is inserted through the through hole 75d of the flange 75b and tightened in the threaded hole 34d of the bottom wall 34b of the second housing member 30, thereby detachably fixing the second heater unit 70 to the outer surface 34f of the bottom wall 34b of the second housing member 30. Thus, the second heater 71 is fixed in contact relation to the outer surface 35b of the spaced part 35 of the second housing member 30.

In the heater-equipped battery pack structure 10 of the present embodiment, the first heater 61 and the second heater 71 are detachably provided outside the housing case 40 (i.e., on the outer surface 35b of the spaced part 35). In other words, the battery pack 50 of the present embodiment is configured so that the first heater 61 and the second heater 71 are detachably attached to the outside of the housing case 40 (i.e., on the outer surface 35b of the spaced part 35). Accordingly, the first and second heaters 61 and 71 can easily be detached from and attached to the housing case 40. This configuration can improve workability in maintenance, replacement, or the like for the first heater 61 and the second heater 71.

The first heater 61 and the second heater 71 are heaters that can be energized or powered by a household AC power source to generate heat. The first heater 61 and the second heater 71 are electrically connected to an alternator plug 15 as shown in FIG. 3. Accordingly, the alternator plug 15 is connected to an outlet of the household AC power source to supply electric power to the first heater 61 and the second heater 71, thereby causing them to generate heat.

Here, a heating function of the heater-equipped battery pack structure 10 will be explained in detail, referring to FIGS. 3 and 4. FIGS. 3 and 4 show the battery pack structure 10 positioned in an orientation in use. The orientation in FIGS. 3 and 4 corresponds to a vertical direction.

In the heater-equipped battery pack structure 10 of the present embodiment, as mentioned above, the first heater 61 and the second heater 71 are placed on the outer surface 35b of the spaced part 35 of the second housing member 30 (the housing case 40). This configuration allows the heat of the first heater 61 and the second heater 71 to be conducted to the spaced part 35, heating the air in the space S through the heated spaced part 35. Then, each secondary battery 100 is exposed to the heated air and heated.

According to the above heating manner, it is possible to prevent uneven heating among the secondary batteries 100 of the battery pack 50 and thus reduce temperature variations among the secondary batteries 100. This makes it possible to reduce variations in output characteristics among the secondary batteries 100. The entire battery pack 50 can therefore produce stable output.

As well as the spaced part 35, the space S exists between each of the heaters 61 and 71 and each of the secondary batteries 100. Accordingly, even where the temperatures of the first heater 61 and the second heater 71 abnormally rise due to any failure or malfunction, each secondary battery 100 can be prevented from excessively increasing in temperature.

As shown in FIG. 7, the first heater unit 60 of the present embodiment is provided with the insulating member 68 on a surface 65g (a lower surface in FIG. 7) of the holder 65 opposite a holding surface 65f making contact with the first heater 61. Similarly, as shown in FIG. 8, the second heater unit 70 is also provided with an insulating member 78 on a surface 75g (a lower surface in FIG. 8) of the holder 75 opposite a holding surface 75f making contact with the second heater 71. Accordingly, the heat of the first and second heaters 61 and 71 are unlikely to escape from the opposite surfaces 65g and 75g of the holders 65 and 75. This configuration therefore allows the heat of the first and second heaters 61 and 71 to be efficiently conducted to the spaced part 35 of the housing case 40. Thus, each secondary battery 100 can be heated efficiently.

Meanwhile, the heater-equipped battery pack structure 10 of the present embodiment is arranged as above to heat the air in the space S so that the heated air heats each secondary battery 100. The thus heated warm air has a lower specific gravity than that of the unheated cold air, tending to move upward in a vertical direction. The heater-equipped battery pack structure 10 of the present embodiment is therefore disposed in use in such a manner that the spaced part 35 of the housing case 40 is located with the space S just below the secondary batteries 100 in the vertical direction, i.e., on a lower side in FIGS. 3 and 4. In other words, during use, the first heater 61 and the second heater 71 are located with the space S below the secondary batteries 100 in the vertical direction. Accordingly, the warm air heated by the first heater 61 and the second heater 71 through the spaced part 35 will move upward to the secondary batteries 100. The thus heated warm air can reach each secondary battery 100 efficiently. According to the heater-equipped battery pack structure 10 of the present embodiment, consequently, each secondary battery 10 can be heated efficiently.

In the heater-equipped battery pack structure 10 of the present embodiment, as shown in FIG. 3, the first heater 61 and the second heater 71 are placed on part of the spaced part 35 without covering all the spaced part 35 in the row direction X of the secondary batteries 100. To be specific, in the row direction X of the secondary batteries 100, the heaters 61 and 71 are located on an outer surface 36b of a portion 36 of the spaced part 35 excepting a specific spaced portion 37 which is located with a space S in an orthogonal direction Y perpendicular to the row direction X of the secondary batteries 100 from a plurality of specific secondary batteries 100b arranged in a region L. As compared with the case where the heaters are placed over the outer surface 35b of the spaced part 35 in the row direction X of the secondary batteries 100, the structure 10 of the present embodiment having no heater on the specific portion 37 can be lower in cost.

Meanwhile, according to a manner of directly heating secondary batteries by heaters placed in contact with the secondary batteries, some specific secondary batteries of the secondary batteries could not be heated unless the heaters are also placed in contact with the specific secondary batteries as well as the other secondary batteries, and the specific secondary batteries remarkably decrease in temperature as compared with the other secondary batteries. This may cause large temperature variations among the secondary batteries. In the case where the plurality of secondary batteries is connected in series to one another, especially, some of the secondary batteries may have large internal resistance due to extreme low temperature. Thus, such low-temperature secondary batteries significantly lower the output of the entire battery pack.

In the present embodiment, on the other hand, the first heater 61 and the second heater 71 located on the other portion 36 can heat the air in the space S through the metal spaced part 35 even though no heat is placed on the specific spaced portion 37. Therefore, the specific secondary batteries 100b can be heated appropriately by the heated air, which results in a reduction in temperature variations among the secondary batteries 100. Even where the secondary batteries 100 are connected in series to one another, the entire battery pack 50 can produce stable output.

Figure 9:
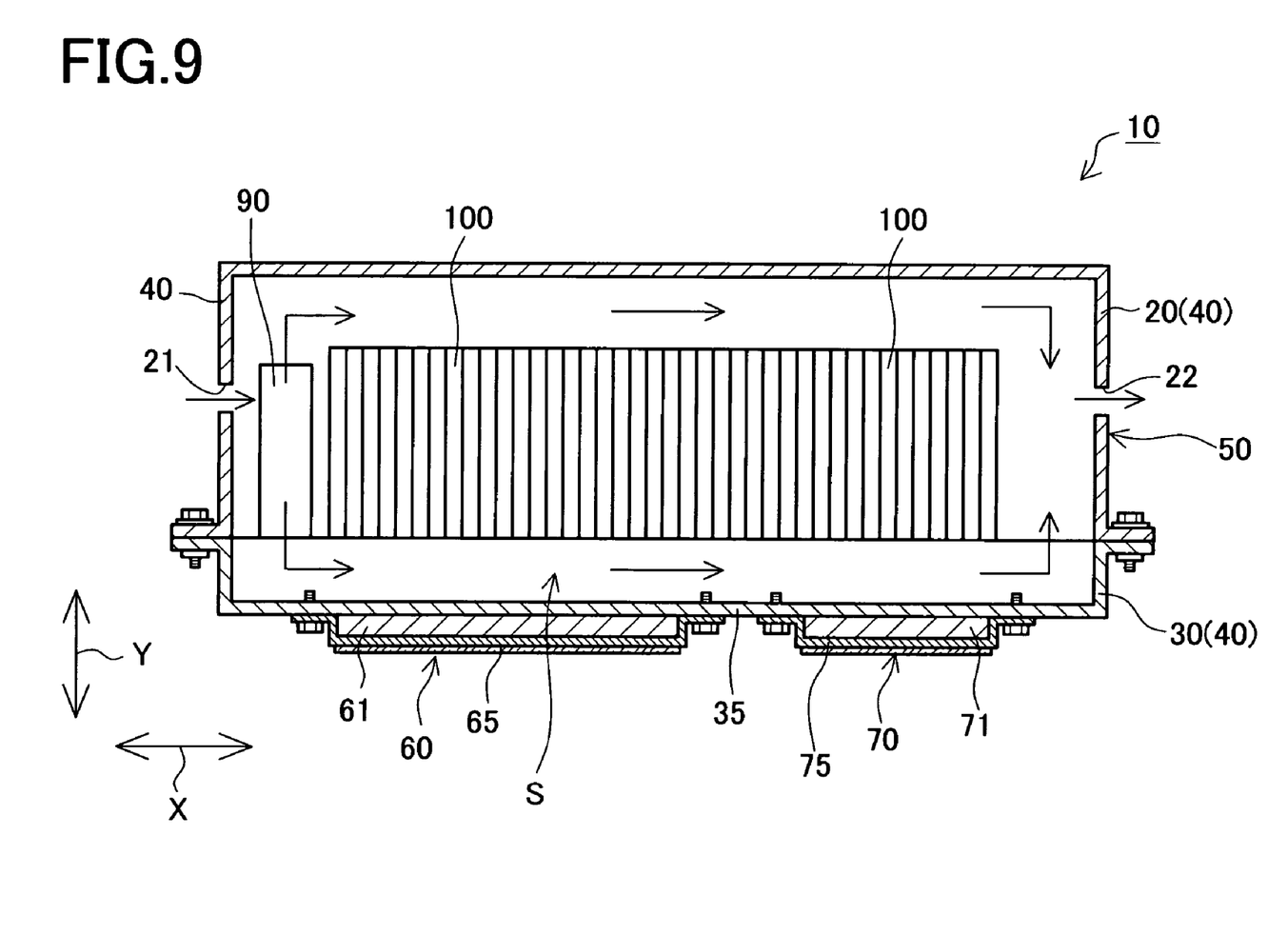
FIG. 9 is an explanatory view showing a cooling function of the battery pack structure with heater, taken along the line P-P in FIG. 1.

In the heater-equipped battery structure 10 of the present embodiment, as shown in FIG. 3, a cooling device 90 is placed in the housing case 40. If the temperatures of the secondary batteries 100 rise to high temperatures, the cooling device 90 is operated to cool the secondary batteries 100. More specifically, as shown in FIG. 9, upon activation, the cooling device 90 takes in outside air through a first air hole 21 of the first housing member 20, delivers cooled air (outside air) through the inside of the housing case 40 including the space S, and discharges the heat of the secondary batteries 100 out of the structure 10 through a second air hole 22. Thus, each of the secondary batteries 100 can be cooled appropriately. In the present embodiment, particularly, no heater exists between each secondary battery 100 and the air passage (including the space S) and therefore each secondary battery 100 can be cooled efficiently.

The following explanation is made on a heat test executed on the heater-equipped battery pack structure 10 of the present embodiment. Specifically, the heater-equipped battery pack structure 10 was put in a constant-temperature bath kept at −40° C. The alternator plug 15 was connected to an outlet of a household AC power source to energize the first heater 61 and the second heater 71. After a lapse of about 6 hours from the start of energization, a temperature T1 of each secondary battery 100 constituting the battery pack 50, a temperature T2 of the spaced part 35 of the housing case 40, and a temperature T3 of the first heater 61 or the second heater 71 were measured.

Figure 10:
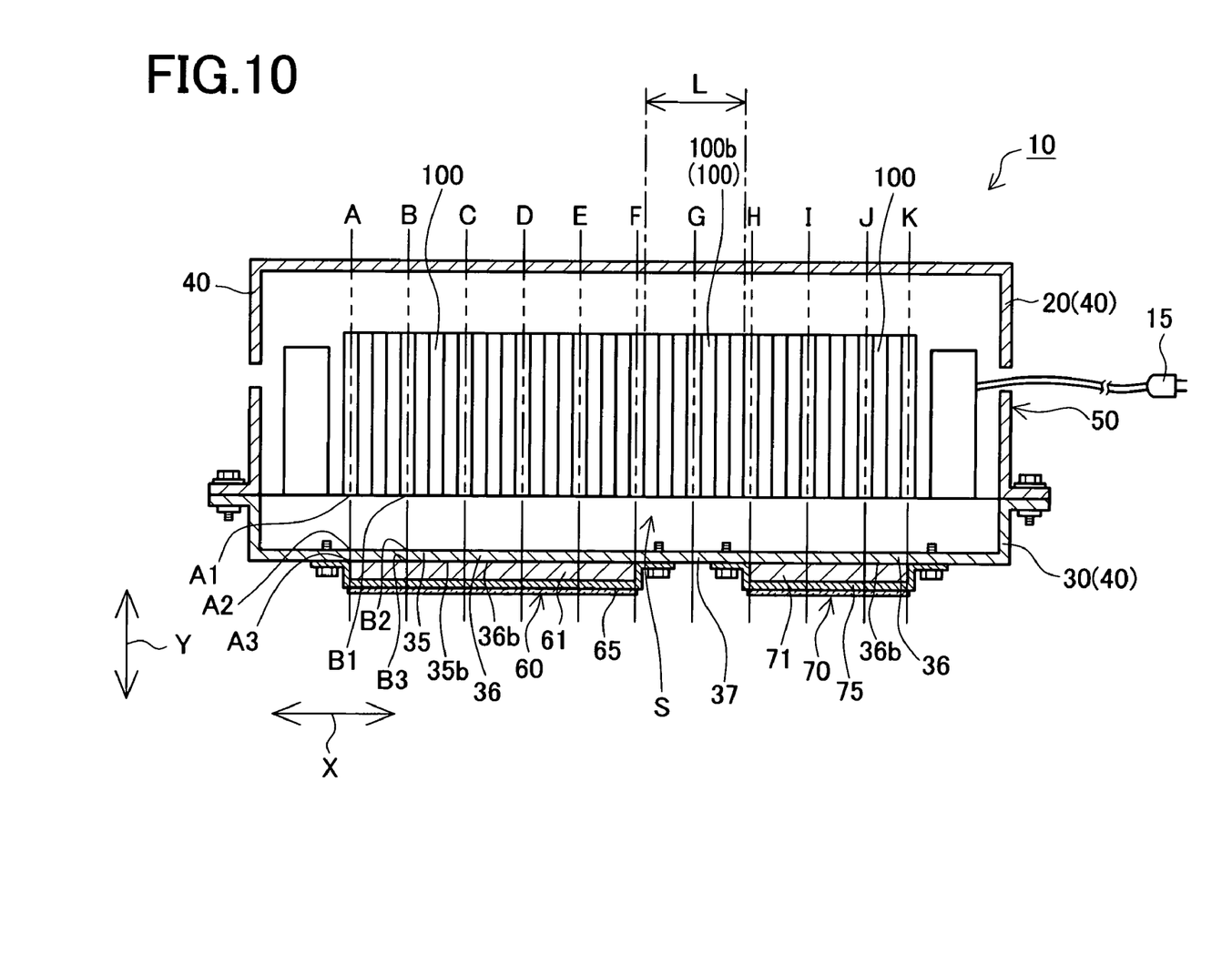
FIG. 10 is an explanatory view showing a heat test in the present embodiment, which corresponds to the sectional view taken along the line P-P in FIG. 1.

To be more specific, in each of eleven positions A to K in the row direction X as shown in FIG. 10, the temperature T1 of each secondary battery 100, the temperature T2 of the spaced part 35 of the housing case 40, and the temperature T3 of the first heater 61 or the second heater 71, were measured to study temperature distributions of T1, T2, and T3 in the range from A to K. In the position A, for example, the temperatures T1, T2, and T3 were measured at a bottom A1 of a secondary battery 100, an inner surface A2 of the spaced part 35, and a surface A3 of the first heater 61 respectively. In the position B, similarly, the temperatures T1, T2, and T3 were measured at a bottom B1 of another secondary battery 100, an inner surface B2 of the spaced part 35, and a surface B3 of the first heater 61 respectively. In this way, the temperatures T1, T2, and T3 were measured in each position A to K. The measurement results are shown in FIG. 11.

Figure 11:
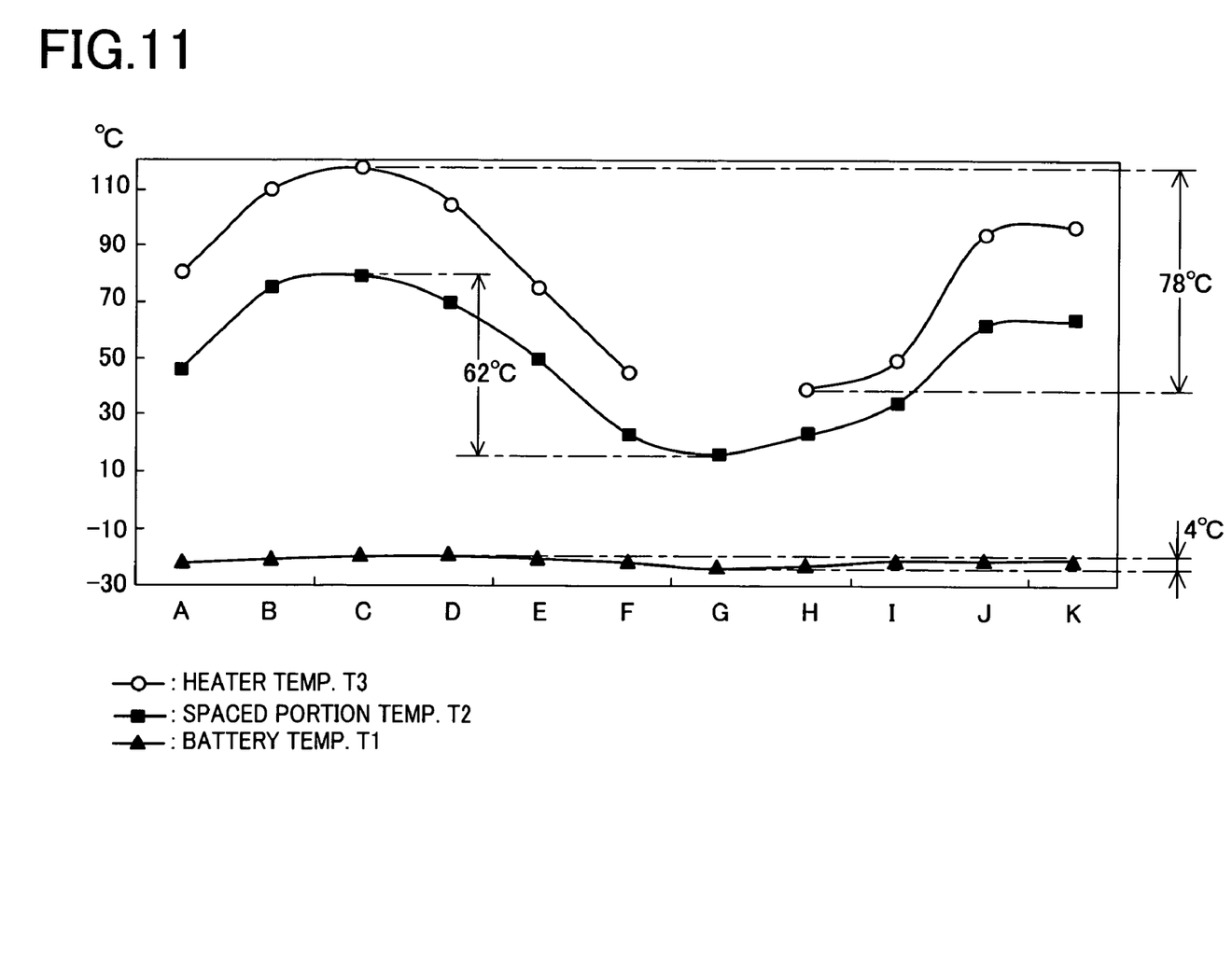
FIG. 11 is a graph showing results of a heat test in the present embodiment.

As indicated by a mark "o" in FIG. 11, the temperature T3 of the first heater 61 or the second heater 71 varied widely among the positions A to K with the maximum temperature difference of as much as 78° C. If the first heater 61 or the second heater 71 is placed in contact with the secondary batteries 100 constituting the battery pack 50, direct heating of the secondary batteries 100 with the heater 61 or 71 conceivably could cause a temperature difference of the same level as above even among all the secondary batteries 100 constituting the battery pack 50.

As indicated by a mark "■" in FIG. 11, the temperature T2 of the spaced part 35 also varied widely among the positions A to K with the maximum temperature difference of as much as 62° C. If the spaced part 35 is placed in contact with the secondary batteries 100 constituting the battery pack 50, direct heating of the secondary batteries 100 through the spaced part 35 also conceivably could cause a temperature difference of the same level as above among all the secondary batteries 100 constituting the battery pack 50.

As indicated by a mark "▲" in FIG. 11, on the other hand, the temperature T1 of each secondary battery 100 varied slightly among the positions A to K with the maximum temperature difference of 4° C. at most. In the present embodiment, particularly, even though no heater is placed in the specific portion 37 of the spaced part 35 as shown in FIG. 10, the specific secondary battery 100b (a measurement position G) had a temperature difference of only 4° C. from a secondary battery 100 (a measurement position D) whose temperature increased to the highest level. As a reason of the above result, it is conceivable that the air in the space S is heated with the first heater 61 and the second heater 71 through the spaced part 35, thereby heating the secondary batteries 100 individually.

As described above, the heater-equipped battery pack structure 10 of the present embodiment can be said to be a heater-equipped battery pack structure capable of preventing uneven heating among the secondary batteries 100 and therefore reducing temperature variations among the secondary batteries 100.

The present invention may be embodied in other specific forms without departing from the essential characteristics thereof.

For instance, in the above embodiment, the secondary battery 100 is exemplified as a battery module including the battery case 101 integrally formed with six compartments 124 and the power generating elements individually accommodated in the compartments 124. Alternatively, the secondary battery may be a cell comprising a single power generating element housed in a battery case.

As the secondary battery in the above embodiment, a secondary battery provided with the resin battery case 101 and others is used. The material of the battery case is not limited to resin and may be selected from metal or other materials. Although the secondary battery in the above embodiment is a nickel-metal hydride storage battery, the present invention can be applied to the case where other batteries such as a lithium ion battery as the secondary battery.

In the above embodiment, the first heater unit 60 and the second heater unit 70 are attached to the battery pack 50 to constitute the heater-equipped battery pack structure 10. Since the first heater unit 60 and the second heater unit 70 are detachably attached to the battery pack 50, whether or not the first heater unit 60 and the second heater unit 70 are attached can be determined depending on ambient temperatures in use. For instance, the first heater unit 60 and the second heater unit 70 may be attached to the battery pack 50 only when the battery pack 50 is used in a cold region, so that in other cases the battery pack 50 may be used without attachment of the first heater unit 60 and the second heater unit 70.

In the above embodiment, the battery pack 50 including the plurality of secondary batteries (forty secondary batteries) 100 arranged in a single row is exemplified. However, the present invention is not limited to such configuration that a plurality of secondary batteries is arranged in one row. The present invention can be applied to another configuration of the battery pack including a plurality of secondary batteries arranged in a plurality of rows (two or more rows).

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A battery pack structure with heater is used as a power source of a vehicle, the battery pack comprising:
   a housing case defining an internal space, the housing having a first housing member and a second housing member with a recessed part, the recessed part forming a spaced part;

a plurality of secondary batteries located between the first housing member and the second housing member, the spaced part of the second housing member and the plurality of secondary batteries defining a single continuous open space therebetween;

a heater provided on at least part of an outer surface of the spaced part directly below both the single continuous open space and the plurality of secondary batteries, in a vertical direction when the battery pack structure is disposed in a position in use, a top surface of the heater being continuous with the outer surface of the spaced part, the spaced part is configured to be heated by the heater which thereby heats the air in the single continuous open space such that heated air in the single continuous open space moves upward by natural convection and indirectly heats the plurality of secondary batteries exposed to the air that moves upward; and a cooling device that is configured to operate when a temperature of the plurality of secondary batteries is higher than a predetermined amount, the cooling device introducing cooling air from outside of the internal space into the internal space, such that the single continuous open space serves as an air passage for the cooling air.

2. The battery pack structure with heater according to claim 1, wherein the heater is detachably placed on the outer surface of the spaced part.

3. The battery pack structure with heater according to claim 1, wherein the secondary batteries are arranged in a row, the spaced part of the housing case includes a specific open spaced portion located within the single continuous open space, adjacent to a specific secondary battery of the secondary batteries in a direction perpendicular to a row direction of the secondary batteries, and the heater is placed on the outer surface of the spaced part excepting the specific spaced portion.

4. The battery pack structure with heater according to claim 1, wherein the secondary batteries are connected in series to each other.

5. The battery pack structure with heater according to claim 1, further including a plurality of heaters, the plurality of heaters being spaced from each other in a horizontal direction of the secondary batteries.

* * * * *